Sept. 26, 1933.    M. L. LABASTROU    1,928,539
ANTIDAZZLING HEADLIGHT
Filed March 18, 1931    2 Sheets-Sheet 1

M. L. Labastrou
INVENTOR

By Marks & Clerk
Attys.

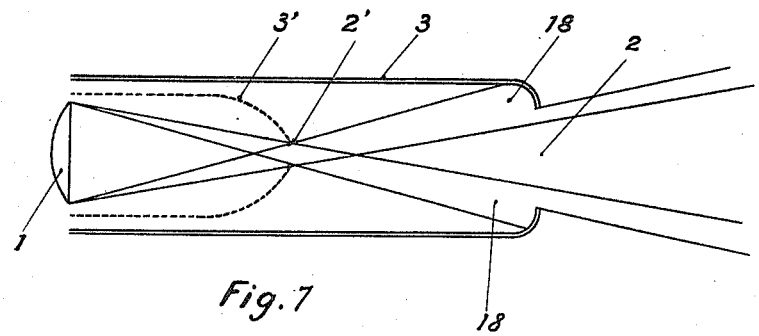
Fig. 6
Fig. 7
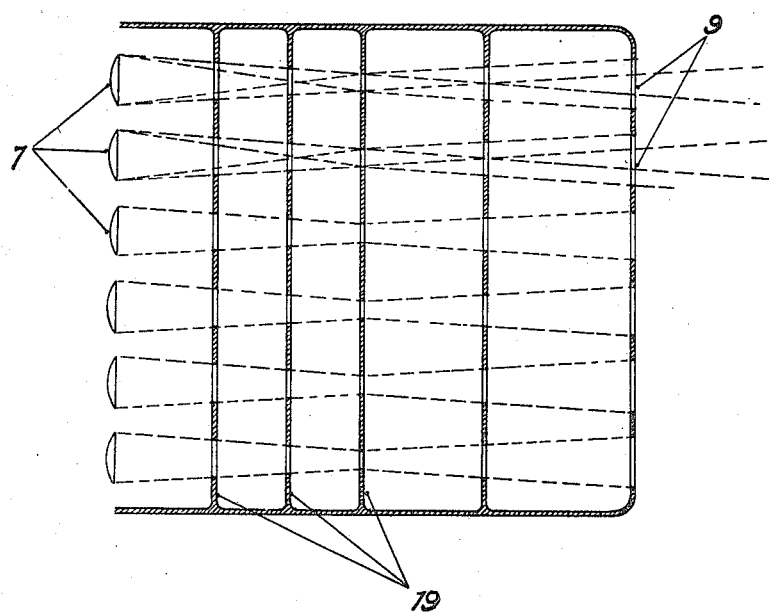
Fig. 8
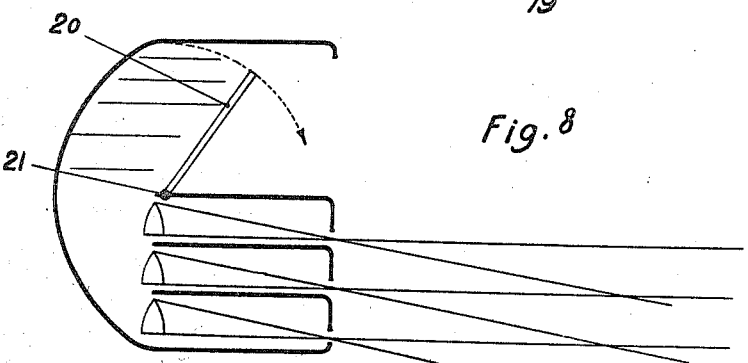

Patented Sept. 26, 1933

1,928,539

UNITED STATES PATENT OFFICE 1,928,539

ANTIDAZZLING HEADLIGHT

Maurice Leon Labastrou, Paris, France

Application March 18, 1931, Serial No. 523,556, and in France March 31, 1930

1 Claim. (Cl. 240—41.3)

It is known that the regulations concerning road traffic require that the light beam produced by a headlight in the cases where it must not be dazzling should not rise above a certain height (about one meter) above ground. On the other hand it is of interest, in order to illuminate with a sufficient intensity distant objects for the headlight to reach as far as possible.

The object of my invention is a headlight fulfilling the above two conditions. It is characterized by the fact that the beam as it passes out of the optic device which provides its convergency, is covered with a cap the inner walls of which cannot either reflect or diffuse light and which shows an aperture which is sufficiently narrow for the useful rays to pass alone out of the cap while the parasitical rays produced for instance by the unavoidable defects of the optic system are stopped by the walls of the cap.

Moreover in order to increase the range of the beam, it is necessary to reduce its angular opening. To this end I may use optic devices disposed inside the cap or else I may divide the total beam into a large number of small elementary beams the opening of each of which is small, said beams passing together out of the headlight.

The following description and accompanying drawings illustrate by way of example several forms of execution of my invention.

Fig. 6 shows a cap preventing the passage of the light rays contained in the penumbra.

Fig. 7 illustrates a multiple beam headlight provided with the device according to the arrangement of Fig. 6.

Fig. 8 shows a special form of execution with a shutter.

Figure 1:
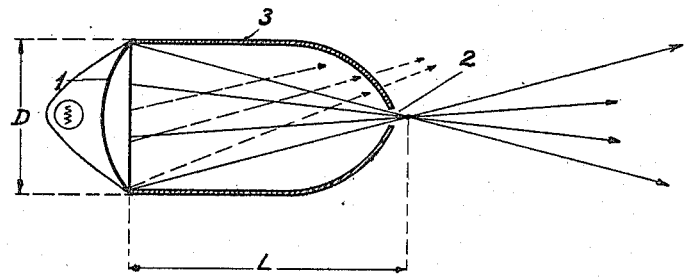
Fig. 1 is a cross-section of a simple headlight with its cap.

With the arrangement shown in Fig. 1, the light rays produced by the source converge under the action of any known or suitable optic device 1 at the focus 2 corresponding to the source so as to form beyond the point 2 a divergent beam satisfying the requirements of the road regulations.

On the figure, this optic device has been shown diagrammatically as a lens 1.

In practice all the light rays do not converge at 2 and some of them, owing to the imperfection of the optic system, pass out of the cone the apex of which is at 2 and the base of which is the outline of the optic device. These rays liable to dazzle must be arrested.

To this end I use a cap 3 bearing against the edges of the optic system 1 and extending up to the point 2 where it shows an aperture which allows the passage only of the beam satisfying the requirements of the road regulations. The inner wall of the hood 3 can neither reflect nor diffuse the rays falling on it, it may for instance be covered with a dull black coating like the inside of optic or photographic apparatuses.

Such a headlight is non-dazzling but its range may be small. It is known that if D is the diameter of the lens and L the distance between it and the aperture 2, the range is proportional to the reverse of the square of the ratio $\frac{D}{L}$. This ratio must therefore be as small as possible, but it is not possible to increase L indefinitely and on the other hand in the case of a single element, it is necessary for D to remain large enough to allow a sufficiently important flux of light to be produced by the apparatus.

This difficulty is set aside, according to my invention, through the division of the entire beam into a large number of elementary beams having a small angular opening and overlapping one another as they pass out of the headlight.

Figure 2:
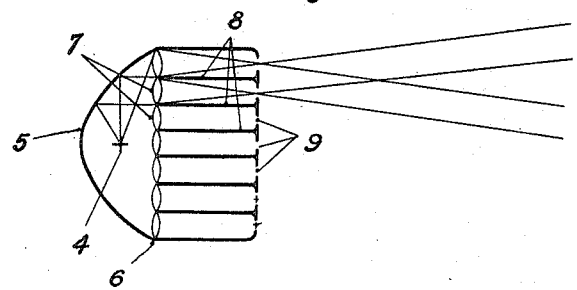
Fig. 2 is a cross-section of a multiple lens headlight producing several beams.

Fig. 2 shows a form of execution of a headlight forming a multiple beam.

The source of light 4 is disposed in front of a parabolic mirror 5 which reflects the rays as a beam parallel to the axis of the head-light. In front of this mirror is disposed a system of convergent lenses 7 each provided with a cap 8 showing an aperture 9 at the main focus of the corresponding lens.

It is apparent that L may retain the same length as in the case of a single element headlight but the diameter D of the lenses is much smaller. I obtain thereby a series of beams overlapping one another partly and having each a comparatively considerable range. The non-used rays, such as those falling directly from the source 4 on one lens, impinge on the walls of the corresponding cap which stop them.

Figure 3:
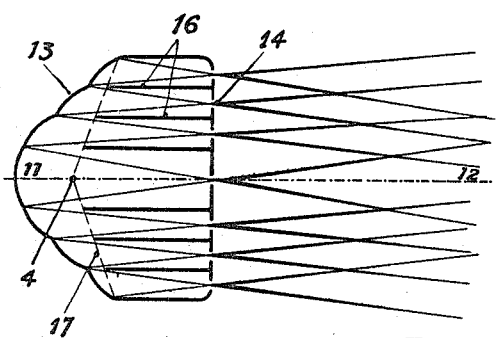
Figs. 3 and 4 show a headlight with convergent mirrors producing several beams.
Figure 4:
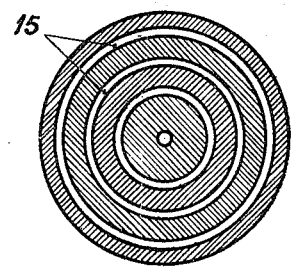

Figs. 3 and 4 show, by way of example, a form of execution using only mirrors for producing the convergency of the beams.

Behind the source 4 is disposed a reflector constituted by a series of rings such as 13 formed by surfaces of revolution the axis of which coincides with the axis 11—12 of the headlight and the meridian line of which is the arc of an ellipse the foci of which are at the source 4 and at the point 14 in the meridian plane or plane of the figure where the beam is to converge. It is apparent that to each ring such as 13 will correspond a beam bounded between two conical surfaces of revolution cutting one another along a parallel circle passing through the point 14.

The front of the cap does not show, as in the case of Fig. 2, a series of small sized apertures, but as shown in Fig. 4, a series of narrow annular slots 15 corresponding each to a ring of the reflector.

With a view to stop the undesired rays, for instance those coming directly from the source without any reflection on the rings, the cap comprises a series of partitions 16 constituted by cylinders the base of which conforms with the periphery of the rings, said partitions being however bounded by the surface of a cone 17 the apex of which is at the source of light 4 and the directing line of which is the periphery of the outer ring.

In order to reduce the angular opening of the light beam without dividing it into elementary beams, it is possible to act on it inside the cap by means of optic devices.

Figure 5:
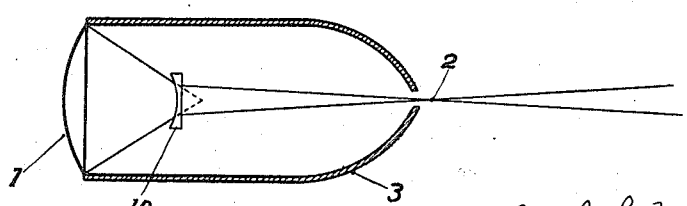
Fig. 5 is a cross-section of a device for increasing the range of the headlight.

Fig. 5 shows a form of execution of such a device which is a modification of that shown in Fig. 1.

The lens 1 has a short focal length and a divergent lens 10 is disposed so as to cut the convergent beam produced by the lens 1.

It is apparent that in this case if $l$ is the distance between the divergent lens 10 and the opening 2 and $d$ the diameter of this divergent lens the range of the beam is reversely proportional to $$\left(\frac{d}{l}\right)^2$$

and not to $$\left(\frac{D}{L}\right)^2.$$

It may thus be greatly increased. Other optic devices reducing the angular opening of the beam may also be used.

I may also design a headlight comprising the combination of several of such elements.

Lastly as a source of light has always a certain surface, the beam is of necessity surrounded by a zone of decreasing luminosity which may be compared with the penumbra of a shadow and which I will consequently term the penumbral beam. It is of interest to reduce it as much as possible because the road regulations generally require the outer surface of the penumbral beam to be parallel to the ground under the stated height whereby the illuminating beam proper must be still lower and therefore impinge against the ground nearer still and the illumination is consequently reduced.

The arrangement according to Fig. 6 allows a reduction of the penumbral beam; it consists in placing the opening of the cap beyond the focus conjugated with the source of light and to give it a diameter such that it stops the outer part of the penumbral beam 18 while it allows the passage of the central part of the beam the luminous intensity of which is sufficient to produce the required illumination at the desired distance.

I have shown in dotted lines in Fig. 6 a cap 3' simliar to that shown in Fig. 1 i. e. its opening 2' is at the focus conjugated with the light source. This cap is replaced by a longer cap 3 the length of which may be reduced through the use of a lens 1 or an optic system more convergent than that used for the simple apparatus of Fig. 1.

Obviously it is possible to combine this latter arrangement with those disclosed previously. Fig. 7 shows by way of example a multi-lens headlight similar to that shown in Fig. 2 wherein the penumbral beam and the stray rays are arrested by series of screens 19 the surface of which can neither reflect nor diffuse light.

It may be of interest to provide a headlight producing normally an ordinary beam illuminating over a comparatively considerable height, which ordinary beam becomes anti-dazzling only in the cases where this is required by the road regulations. In such a case I may use the headlight shown in Fig. 8.

The lower part of the beam passes alone into the cap arrangement according to my invention for instance through a multi-lens system as in the case of Fig. 2. The upper part passes freely out of the headlight and may be screened at will through any suitable means such as a movable screen disposed near the lamp and adapted to stop the rays falling on the mirror or else as shown in Figure 8 by a shutter 20 adapted to rotate round a horizontal axis 21 and to come into the path of the upper light rays passing out of the headlight.

What I claim is:

An anti-dazzling headlight comprising a light, a mirror the reflecting surface of which is composed of ellipses the foci of which are at the light, and each elliptical surface being shaped to form a beam bounded between two conical surfaces of revolution cutting one another along concentric circles, cylindrical partitions dividing the beam into concentric cylindrical portions, the partitions having turned over end portions spaced apart to form openings through which the reflected light beam passes, the parasitic rays being absorbed by said cylindrical partitions.

MAURICE LEON LABASTROU.